Nov. 3, 1953　　　　B. E. HOUSE　　　2,657,767
BRAKE ASSEMBLY
Filed April 10, 1950　　　　　　　　2 Sheets—Sheet 1

INVENTOR.
BRYAN E. HOUSE
BY
ATTORNEY

Nov. 3, 1953   B. E. HOUSE   2,657,767
BRAKE ASSEMBLY
Filed April 10, 1950   2 Sheets-Sheet 2

INVENTOR.
BRYAN E. HOUSE
BY
ATTORNEY

Patented Nov. 3, 1953

2,657,767

UNITED STATES PATENT OFFICE 2,657,767

BRAKE ASSEMBLY

Bryan E. House, Ashtabula, Ohio, assignor to Bendix Aviation Corporation, South Bend, Ind., a corporation of Delaware Application April 10, 1950, Serial No. 155,010

19 Claims. (Cl. 188—78)

The present invention relates to improvements in the construction and arrangement of brakes, and more particularly in brakes of the internal expanding type.

The primary object of this invention is to provide a simple, inexpensive brake embodying a minimum of component parts simple in design and fabricated of common, relatively inexpensive material.

Another object is to provide an inexpensive brake which is equally effective in either forward or reverse direction of vehicle travel. At the present time, a great demand is developing for the smaller size garden or farm tractors which must be rugged and sufficiently powerful to do the intended job, yet be as inexpensive as possible. In numerous instances, the tractor is called upon to transport a load over a hill. If the tractor should stall during its ascent or descent, a braking force would obviously be needed to hold it in place until the stalled condition could be remedied. Such a braking requirement is satisfied by the present invention which provides that the same normal braking pressure exerted by the operator will develop the same braking power at the wheels of the vehicle irrespective of its direction of travel, thereby facilitating consistent control of the vehicle.

Another object of this invention is to provide a novel actuating structure for the brake.

Other objects and objects ancillary thereto will become obvious as the description proceeds.

Figure 1:
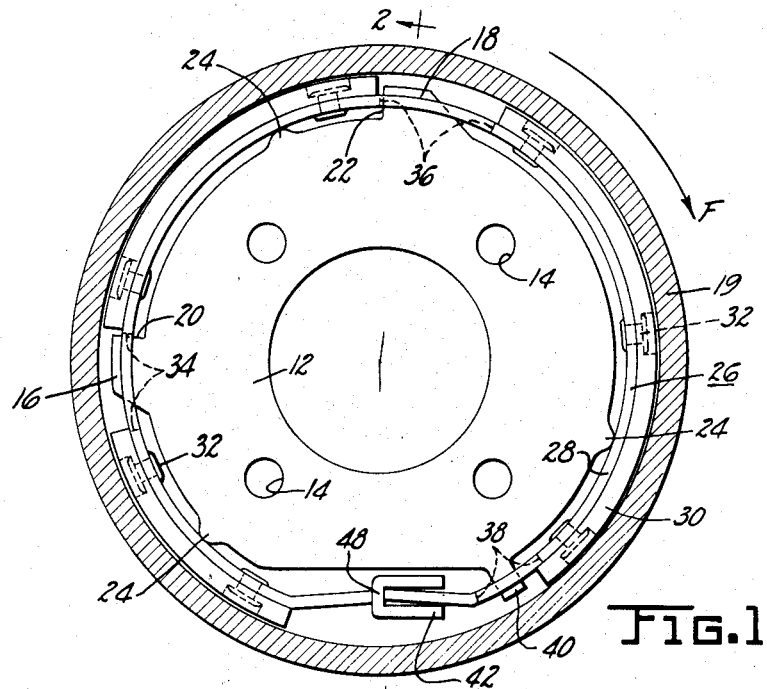
Figure 1 is a side elevation of an embodiment of the present invention.
Figure 2:
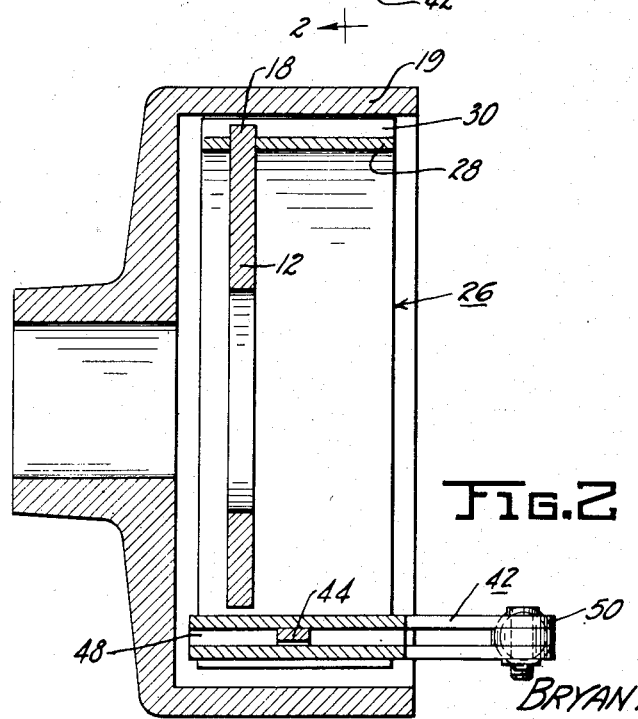
Figure 2 is an axial section taken substantially on the section line 2—2 of Figure 1.

Referring now to the drawings, a flat annular supporting plate, or spider, 12 is adapted to be secured to a nonrotatable member by means of suitable fastening members extending through the openings 14. This plate 12, which will ordinarily be formed by stamping, has a pair of circumferentially spaced, radially diverging projections 16 and 18 which serve as brake shoe anchors, projection 18 taking the anchor load for clockwise rotation of drum 19 and projection 16 for counterclockwise rotation. Each of these projections 16 and 18 is provided with substantially radially extending flat anchor surfaces 20 and 22, respectively, which face each other in an arcuate sense and are spaced a predetermined distance apart. In the illustrated version of this invention, these surfaces 20 and 22 are spaced approximately 90° apart; however, this spacing can vary in accordance with certain other structural considerations, to be described hereinafter, in keeping with this invention.

Three radially outwardly projecting bumps 24 are formed on supporting member 12 approximately 120° apart and serve to radially locate the brake friction element 26. This friction element or brake shoe 26 is preferably formed of a resilient metal backing member or rim 28 which is of split annular shape and sprung to tend to collapse inwardly against bumps 24. Friction lining 30 is fastened to rim 28 in any suitable manner, such as by means of rivets 32. With the shoe formed in this manner, it serves as brake release means, thereby removing the need for the usual coiled return springs. Radial slots 34 and 36 are formed in this shoe 26 to fit over anchor projections 16 and 18, respectively, and another slot 38 may be provided to receive an ear 40 on plate 12. These slots may be located at any point transversely of the shoe 26 depending upon design preferences and serve to locate the shoe on plate 12. The slots 34 and 36 are of predetermined length with one edge of slot 34 being engageable with anchor surface 20 and one edge of slot 36 being engageable with anchor surface 22, the direction of rotation of drum 19 determining which anchor surface will be engaged. As is obvious from the description thus far, this shoe is the ultimate in simplicity and may be fabricated by conventional stamping and forming methods.

The actuating mechanism of the brake constitutes a very simple and inexpensive structure. It consists of a lever 42 which is carried by the ends of the shoe 26. As shown in Figure 1, these ends are bent slightly inwardly to substantially coincide with a chord of the brake shoe circle, the end edges thereby facing each other. Also, referring to Figure 3, one end of the shoe 26 is provided with a projection or tongue 44 which is shaped complementary to a recess 46 formed in the other shoe end.

The lever 42 consists of a sheet metal stamping formed to a substantially U-shape with the connecting portion 48 thereof lying between the shoe ends and apertured at 49 to receive the tongue 44. The sides of the lever 42 loosely embrace the recessed end portion of the brake shoe. An extension 50 on lever 42 is suitably adapted to be fastened to a tension linkage which is normally drawn to the left to apply the brake.

Figure 4:
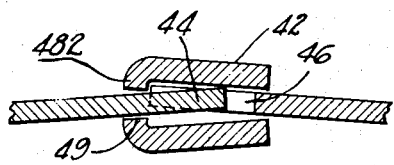
Figure 4 is a transverse section taken through the actuating mechanism on section line 4—4 of Figure 3 and showing a different form of lever than that of Figure 1.

The lever 42 of Figure 4 is slightly different than the one in Figure 1, the connecting portion 482 being slightly longer than portion 48 of Figure 1, and the lever sides being bent inwardly a sufficient amount to properly embrace the shoe ends.

The brake assembly is now complete, having essentially only three parts; the supporting plate 12, the shoe 16, and the applying lever 42. Actuation is accomplished by moving the outer end of lever extension 50 to the left, thereby swinging lever 42 to spread the shoe ends apart until the desired force of engagement of shoe 26 with the drum 10 is effected.

Figure 3:
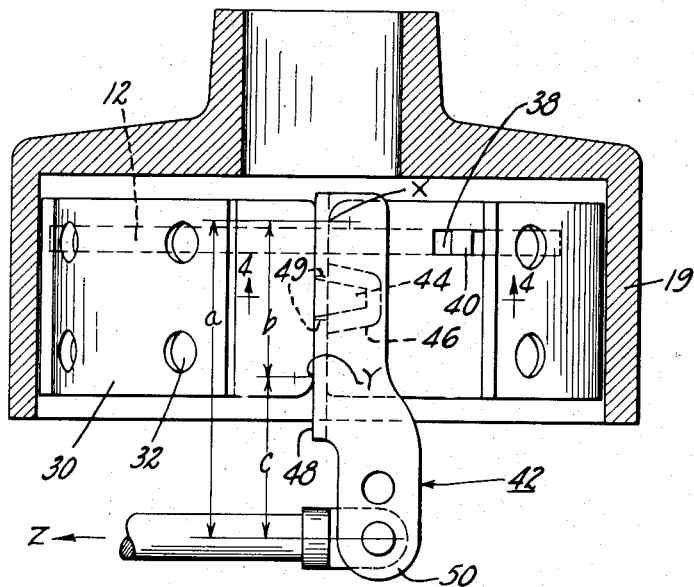
Figure 3 is a plan view of the brake assembly of Figure 1 showing the actuating mechanism.

The following constitutes a description of how the various brake parts are arranged to achieve the equal forward and reverse braking mentioned earlier. Referring to Figure 3, two fulcrum points of lever 42 are generally indicated by reference letters X and Y. It should be noted that poin X lies at a point of contact of lever 42 with the right-hand end edge of shoe 26, and point Y lies at a point of contact of lever 42 with the left-hand edge of said shoe.

Now assuming the direction of drum rotation to be that indicated by the arrow F of Figure 1, and the line of applying force exerted on extension 50 to be that coincident with arrow Z, Figure 3, the lever 42 will fulcrum about the area of point X and apply in the vicinity of point Y. The leverage ratio thereby obtained is the length of the lever arm to fulcrum X, indicated as "$a$," divided by the arm length to point Y, indicated as "$b$." Assuming this action to be forward braking, the leverage ratio is $a/b$ or, as illustrated, approximately 2 to 1, this number representing a mechanical advantage.

With the opposite direction of drum rotation, the vicinity of point Y becomes the fulcrum and the area of point X the vicinity of application. By the same procedure in resolving forces, the leverage ratio becomes $c/b$, "$c$" being the moment arm produced by force Z about Y. This ratio, as illustrated, is more nearly unity, it now becoming evident that for forward braking the mechanical advantage is greater than that for reverse braking by approximately two times.

Because of this difference in leverage ratios for forward and reverse braking, the forward braking anchor 18 is located approximately 180° from lever 42, and reverse braking anchor 16 approximately 270°, moving from lever 42 in a counter-clockwise direction. Actually, with this anchor arrangement, the braking power capable of being developed by the 270° section of brake shoe is proportionately greater than that capable of being developed by the 180° section. Thus it is seen that the difference in leverage ratios can be balanced or compensated for by properly choosing the locations of the forward and reverse anchor points so that brake effectiveness will be substantially the same for either direction of drum rotation with the same brake applying force Z.

It is obvious that any desired combination of anchor spacing and leverage ratios may be used to obtain a desired ratio of brake effectiveness for forward and reverse braking, it being conceivable that in some instances more braking power is needed in forward and in others in reverse.

Although only one embodiment of the invention has been illustrated and described, various changes in the form and relative arrangements of the parts may be made to suit requirements.

I claim:

1. For use in cooperation with a rotatable drum, a brake comprising a flat annular supporting plate which is adapted to be secured to a nonrotatable member and which has a pair of circumferentially spaced radially diverging facing anchor projections, a split annular brake shoe consisting of a resilient backing member and a lining secured thereto, said shoe having a plurality of circumferentially arranged radial slots, at least one ear on said supporting plate projecting radially outwardly, said ear and said anchor projections extending into respective slots to laterally position said shoe, said shoe anchoring on one of said projections for one direction of drum rotation and on the other projection for the other direction of drum rotation, the adjacent ends of said backing member being formed with a complementary tongue and recess, a plurality of radially diverging projections provided on said supporting plate to space said shoe from the periphery of said plate, and an applying lever consisting of an elongated rigid member of U-shaped cross section, an opening formed in the bottom of said lever between its ends, said lever being interposed between said adjacent ends to straddle the recessed shoe end portion with said opening receiving said tongue whereby rotation of said lever in a plane normal to said supporting plate spreads the ends of said shoe to force it into engagement with the drum.

2. For use in cooperation with a rotatable drum, a brake comprising a flat annular supporting plate which is adapted to be secured to a nonrotatable member and which has a pair of circumferentially spaced radially diverging facing anchor projections, a split annular brake shoe consisting of a resilient rim and a lining secured thereto, said shoe having a plurality of circumferentially arranged radial slots, said anchor projections extending into respective slots, said shoe anchoring on one of said projections for one direction of drum rotation and on the other projection for the other direction of drum rotation, the adjacent ends of said rim being formed with a complementary tongue and recess, and an applying lever consisting of an elongated rigid member of U-shaped cross section, an opening formed in the bottom of said lever between its ends, said lever being interposed between said adjacent ends to straddle the recessed shoe end portion with said opening receiving said tongue whereby rotation of said lever spreads the ends of said shoe to force it into engagement with the drum.

3. A brake comprising a supporting plate having two circumferentially spaced anchor portions, a split annular brake shoe consisting of a resilient rim and a lining, said shoe having at least a pair of circumferentially arranged slots for receiving respective anchor portions, the adjacent ends of said shoe being formed with a complementary tongue and recess, and an applying lever consisting of an elongated rigid member of U-shaped cross section, an opening formed in the bottom of said lever between its ends, said lever being interposed between said adjacent ends to straddle the recessed shoe end portion with said opening receiving said tongue whereby rotation of said lever spreads the ends of said shoe to force it into engagement with the drum, said shoe anchoring on one of said anchor portions for one direction of drum rotation and on the other for the other direction of drum rotation, the spacing between said anchor portions in combination with the leverage ratio of said applying lever being such that the brake is equally effective for both directions of drum rotation, and said shoe serving as brake release means.

4. A brake comprising a supporting plate having two circumferentially spaced anchor portions, a split annular brake shoe consisting of a resilient rim and a lining, said shoe having at least a pair of circumferentially arranged slots for receiving respective anchor portions, the adjacent ends of said shoe being formed with a complementary tongue and recess, and an applying lever having spaced side portions and a connecting portion, said connecting portion being interposed between the shoe ends and receiving therethrough said tongue, said shoe anchoring on one of said anchor portions for one direction of drum rotation and on the other for the other direction of drum rotation, the spacing between said anchor portions in combination with the leverage ratio of said applying lever being such that the brake is equally effective for both directions of drum rotation, and said shoe serving as brake release means.

5. A brake comprising a supporting member having two spaced anchor portions, a brake shoe having juxtaposed ends, said ends being formed with a complementary tongue and recess, and an applying lever having spaced side portions and a connecting portion, said connecting portion being interposed between the shoe ends and receiving said tongue, said shoe anchoring on one of said anchor portions for one direction of drum rotation and on the other for the other direction of drum rotation, the spacing between said anchor portions in combination with the leverage ratio of said applying lever being such that the brake is equally effective for both directions of drum rotation, and said shoe serving as brake release means.

6. A brake comprising a supporting member having two spaced anchor portions, a brake shoe having juxtaposed ends, said ends being formed with a complementary tongue and recess, and an applying lever having spaced side portions and a connecting portion, said connecting portion being interposed between the shoe ends and receiving said tongue, said shoe anchoring on one of said anchor portions for one direction of drum rotation and on the other for the other direction of drum rotation, the spacing between said anchor portions in combination with the leverage ratio of said applying lever being such that the brake is equally effective for both directions of drum rotation.

7. A brake comprising a supporting member having two spaced anchor portions, a brake shoe having juxtaposed ends, said ends being formed with a complementary tongue and recess, and an applying lever having spaced side portions and a connecting portion, said connecting portion being interposed between the shoe ends and receiving said tongue, said shoe anchoring on one of said anchor portions for one direction of drum rotation and on the other for the other direction of drum rotation, and said shoe serving as brake release means.

8. A brake comprising a supporting member having two spaced anchor portions, a brake shoe having juxtaposed ends, means formed at the ends of said shoe restricting excessive lateral deflection of said ends with respect to each other, and an applying lever having spaced side portions and a connecting portion, said connecting portion being interposed between the shoe ends and being partially held in place by said means, said shoe anchoring on one of said anchor portions for one direction of drum rotation and on the other for the other direction of drum rotation.

9. A brake for use with a rotatable drum comprising a supporting member having two spaced anchor portions, a brake shoe having juxtaposed ends and adapted to selectively anchor on one or the other of said portions, and an applying lever having spaced side portions and a connecting portion, said connecting portion being interposed between the shoe ends, said shoe anchoring on one of said anchor portions for one direction of drum rotation and on the other for the other direction of drum rotation.

10. A brake for use with a rotatable drum comprising a supporting plate having anchor means thereon, a friction element arranged to anchor on said means and having its ends in proximity with each other, and an applying lever interposed between said ends whereby rotational movement of said lever will cause said element to engage said drum, said anchor means and said applying lever being so arranged that the effectiveness of said element will be the same for either direction of drum rotation.

11. A brake for use with a rotatable drum comprising a supporting member having two spaced anchor portions, a brake shoe having juxtaposed ends and adapted to selectively anchor on one or the other of said portions, and an applying lever having spaced side portions and a connecting portion, said connecting portion being interposed between the shoe ends whereby swinging movement of said lever will cause said brake shoe to engage said drum, said anchor portions and said applying lever being so arranged that the effectiveness of said shoe will be the same for either direction of drum rotation.

12. In a brake for use with a rotatable drum and having a supporting plate provided with a brake shoe anchor portion thereon; a brake shoe having its ends adjacent one another, one end being formed with a recess and the other end having a projection extending into said recess, and an applying lever having spaced side portions which straddle said recessed shoe end, a connecting portion securing said side portions together, said connecting portion being adapted to receive said projection and being interposed between said ends, said lever being swingable to spread said ends to actuate the brake.

13. In a brake for use with a rotatable drum and having a supporting plate provided with a brake shoe anchor portion thereon, a brake shoe having its ends adjacent one another, an applying lever having rigidly connected side portions straddling one end portion of said shoe, and locating means formed in the ends of said shoe restricting said ends from lateral displacement relative to each other and partially supporting said lever, said lever being swingable in a plane transverse the plane of the supporting plate to spread said ends apart to apply the brake.

14. In a brake for use with a rotatable drum and having a supporting plate provided with a brake shoe anchor portion thereon, a brake shoe having its ends adjacent one another, an applying lever having rigidly connected side portions straddling one end portion of said shoe, and locating means on one of said ends providing partial support for said lever, said lever being swingable in a plane transverse the plane of the supporting plate to spread said ends apart to apply the brake.

15. A brake for use with a rotatable drum comprising a supporting member having two spaced anchor portions, an expansible friction device having juxtaposed ends and adapted to selectively anchor on one or the other of said portions, and an applying lever arranged to directly engage said ends to exert a spreading force thereon, said anchor portions and said lever being so arranged that the effectiveness of said device will be the same for either direction of drum rotation.

16. A brake for use with a rotatable drum comprising a supporting member having two spaced anchor portions, an expansible friction device having juxtaposed ends and adapted to selectively anchor on one or the other of said portions, and an applying lever arranged to exert a spreading force on said ends and being interposed between and engaging said ends in such a manner that for one direction of drum rotation it will fulcrum on one shoe and for the other direction of drum rotation it will fulcrum on the other shoe, said anchor portions and said lever being so arranged that the effectiveness of said device will be the same for either direction of drum rotation.

17. A brake for use with a rotatable drum comprising a supporting member having two spaced anchor portions, an expansible friction device having juxtaposed ends and adapted to selectively anchor on one or the other of said portions, and an applying lever transverse said supporting member and arranged to exert a spreading force on said ends and being interposed between and engaging said ends in such a manner that for one direction of drum rotation it will fulcrum on one shoe and for the other direction of drum rotation it will fulcrum on the other shoe, said anchor portions and said lever being so arranged that the effectiveness of said device for both directions of drum rotation will be in accordance with a predetermined ratio.

18. A brake for use with a rotatable drum comprising a supporting member having two spaced anchor portions, a brake shoe having juxtaposed ends and adapted to selectively anchor on one or the other of said portions, and an applying lever having spaced side portions and a connecting portion, said connecting portion being interposed between the shoe ends whereby swinging movement of said lever will cause said brake shoe to engage the drum, said anchor portions and said applying lever being so arranged that the effectiveness of said shoe for one direction of drum rotation will bear a predetermined relation to the effectiveness of said shoe for the other direction of drum rotation.

19. A brake comprising a supporting member having two spaced anchor portions, a brake shoe having juxtaposed ends, said ends being formed with a complementary tongue and recess, and an applying lever having spaced side portions and a connecting portion, said connecting portion being interposed between the shoe ends and receiving said tongue, said shoe anchoring on one of said anchor portions for one direction of drum rotation and on the other for the other direction of drum rotation, the spacing between said anchor portions in combination with the leverage ratio of said applying lever being such that the brake effectiveness for the different directions of drum rotation will be in accordance with a predetermined ratio.

BRYAN E. HOUSE.

References Cited in the file of this patent
UNITED STATES PATENTS

| Number | Name | Date |
|---|---|---|
| 1,152,511 | Hutchinson | Sept. 7, 1915 |
| 1,536,640 | Vanderbeek | May 5, 1925 |
| 1,596,266 | Heinzelman | Aug. 17, 1926 |
| 1,930,779 | Snell | Oct. 17, 1933 |
| 1,978,723 | Rosner | Oct. 30, 1934 |
| 2,012,647 | Wadsworth | Aug. 27, 1935 |
| 2,028,625 | Rosner | Jan. 21, 1936 |
| 2,395,551 | Irving et al. | Feb. 26, 1946 |